United States Patent [19]
Ciniglio et al.

[11] Patent Number: 5,192,014
[45] Date of Patent: Mar. 9, 1993

[54] DIP SOLDERING APPARATUS

[75] Inventors: Alexander J. Ciniglio; Neil C. Squire, both of Essex, Great Britain

[73] Assignee: Pillarhouse International Limited, Great Britain

[21] Appl. No.: 775,747

[22] Filed: Oct. 15, 1991

[30] Foreign Application Priority Data

Oct. 15, 1990 [GB] United Kingdom ............... 9022333
Oct. 15, 1990 [GB] United Kingdom ............... 9022336

[51] Int. Cl.⁵ .............................................. B23K 1/00
[52] U.S. Cl. .................................. 228/34; 118/422; 266/228
[58] Field of Search ............ 228/34, 56.1, 180.1, 228/259, 36, 40; 118/422, 423; 427/431; 266/228

[56] References Cited
U.S. PATENT DOCUMENTS

| | | | |
|---|---|---|---|
| 1,783,642 | 12/1930 | Ferguson et al. | 228/34 |
| 2,349,972 | 5/1944 | Lister | 266/228 |
| 4,004,333 | 1/1977 | Daniels | 29/38 C |
| 4,332,373 | 6/1982 | Huppunen et al. | 266/228 |
| 4,509,670 | 4/1985 | Cammarata | 228/56.2 |
| 4,785,762 | 11/1988 | Miyazaki et al. | 118/423 |
| 5,087,356 | 2/1992 | Webb | 228/34 |

FOREIGN PATENT DOCUMENTS

| | | | |
|---|---|---|---|
| 0893323 | 12/1981 | U.S.S.R. | 228/259 |
| 381203 | 9/1932 | United Kingdom . | |
| 563846 | 8/1944 | United Kingdom . | |
| 1442966 | 7/1976 | United Kingdom . | |

Primary Examiner—Richard K. Seidel
Assistant Examiner—Jeanne M. Elpel
Attorney, Agent, or Firm—Waldron & Associates

[57] ABSTRACT

In a dip soldering apparatus, a first scraper blade scrapes the surface of the solder bath before a pot is raised through the surface of the bath, and a second blade then scrapes the surface of solder in the pot when the pot has been lifted through the surface. The blades are swept around in a circle to facilitate operation of the device. A rotary station for feeding components to the soldering apparatus comprises a rotatable table carrying a plurality of pneumatically operated stations to index them sequentially through operating positions. The air supply lines, for pneumatic control and operation of each station, are discrete to the respective operating positions and so it is not necessary to provide a system of supply lines which rotate with the stations. An end of a supply line is sealed to a conduit in the table by a PTFE sealing member which has an inwardly directed, tapered lip. As air pressure in the line is increased (to operate the station) the lip is urged against the underside of the table.

6 Claims, 4 Drawing Sheets

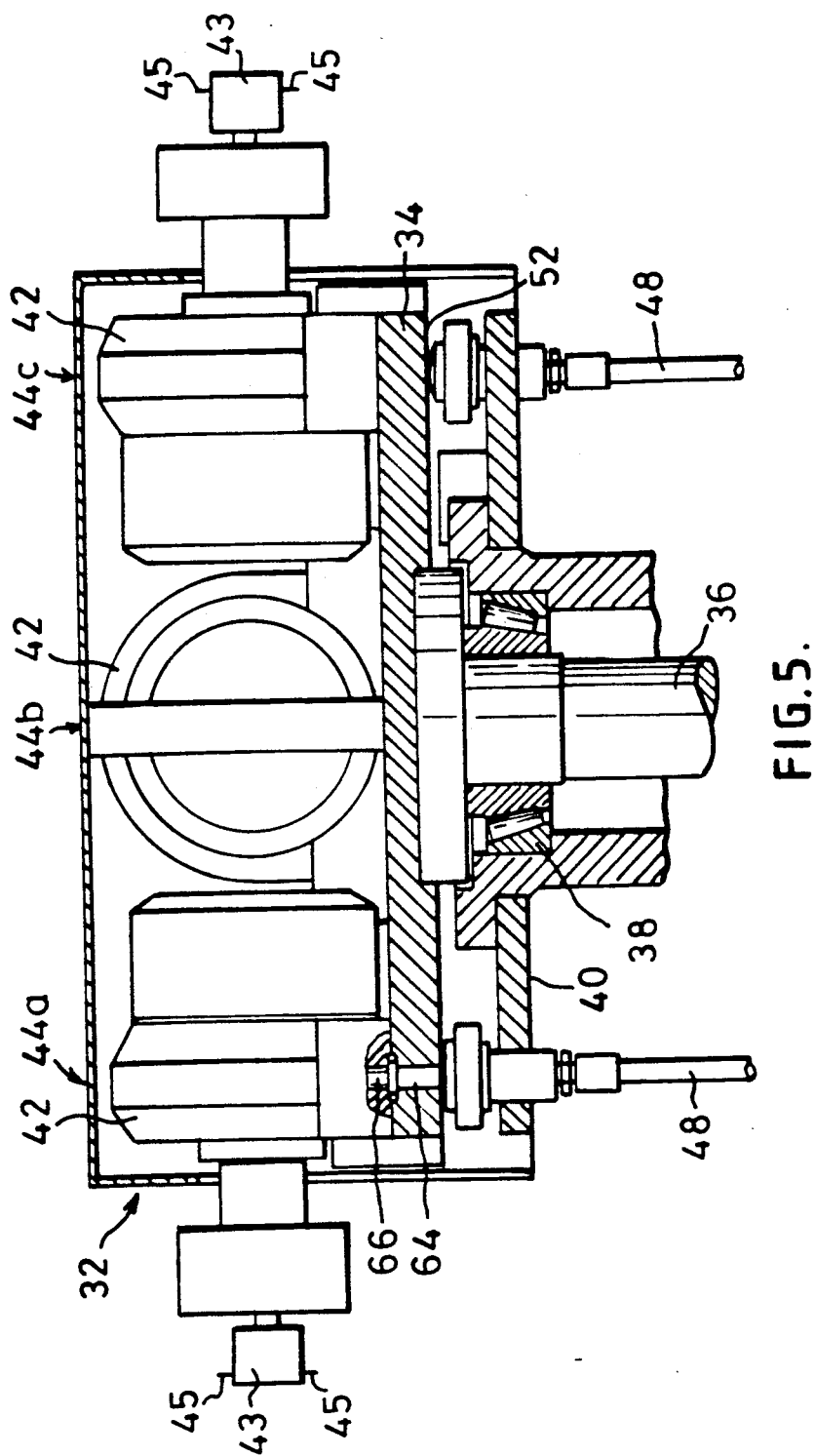

DIP SOLDERING APPARATUS

INTRODUCTION AND BACKGROUND

The present invention relates to soldering apparatus and in particular to dip soldering apparatus. In dip soldering apparatus a tag or lead to be soldered or tinned is dipped into a pot of solder. The pot is raised up from underneath the surface of a bath of solder. In such apparatus there is a particular problem with the formation of dross (oxidised solder) on the surface of the solder bath. To try and keep the surface of the solder in the pot free of dross, the surface of the bath is scraped shortly before the pot is raised through it. There are various known systems for doing this, one uses a blade which passes forwards and then backwards across the solder of the surface, another uses a radially extending blade which extends across the surface of a rotating bath of solder. Such systems are described in GB-A-1442966. GB-A-563846 describes an apparatus in which a blade is swept in a vertical arc across the bath surface or across the surface of the raised pot. It has been found that these systems can still result in a solder surface in the pot which is not sufficiently clean or which is not at an accurately reproducible height.

SUMMARY OF THE INVENTION

A first aspect of the invention provides a soldering apparatus comprising a bath of solder, and a pot movable from beneath the surface of the solder in the bath, wherein scraper means is provided for scraping the surface of solder in the bath before the pot is moved upwards through the surface and for scraping the surface of solder in the pot after it has moved upwards through the surface of the solder in the bath.

It has been found that by removing dross or scum (primarily oxidised solder) from the surface of the bath before the pot breaks through the surface, and by wiping the pot surface after the pot has broken through the solder surface, a cleaner and more accurately controlled solder level is presented to the component leads to be tinned or soldered. When the pot breaks the surface of the previously wiped bath, some dross may be still be present and will cling to the lip of the pot. It is believed that this can cause solder to siphon out of the raised pot, back into the bath. This results in an unpredictable solder level in the pot. By wiping the pot surface, and in particular by scraping across the rim of the pot, scum on the pot rim is scraped away and so prevents siphoning off. Also any scum remaining on the solder surface in the pot is removed and the meniscus of the solder in the pot is lowered to near the level of the pot rim.

Very preferably, the solder surfaces are wiped by a blade which sweeps across the solder surface. Two blades may be used in quick succession, the first wiping the solder in the bath and the second wiping the surface of the pot. It is particularly preferred that the blade or blades be carried on an arm which sweeps in a horizontal arc across the solder surface. Preferably a blade is of non-metallic material having a low thermal conductivity to reduce the tendency of solder to stick to the blade.

The blade or blades may be freely pivoted, of square shape at their lower end, on respective radial arm(s). The lower edge of the blade is arranged, with the blade vertical, to fall below the surface of the solder in the bath, or below the rim of the pot, so that the blade is tilted as it sweeps across the solder surface of the pot rim, the weight of the blade carrying the solder scum before it.

Preferably the upward movement of the pot is halted as the blade sweeps across the pot surface.

A second aspect of the invention provides soldering apparatus comprising a stationary bath of solder and a wiper blade which is arranged to sweep across the surface of solder in the bath, the bath being stationary and the blade sweeping in a complete circle. Preferably a plurality of blades is provided, the blades sweeping in turn across the surface of the solder bath. The solder bath is heavy and needs to be thermally insulated to reduce heat loss to the surroundings. Thus it is of advantage to keep the bath stationary and to sweep the blade across the bath surface in a constant direction.

Typically components to be soldered or tinned are carried through a sequence of operations by a rotary station. For example, the component may be moved through four positions by such a station: a first, loading position for loading the component into a station; a second position where the components leads are dipped into a fluxing compound; a third position where the leads are tinned, and a fourth position where the component is tested and then removed, or it may be removed at the first opposition on completion of the cycle. Such a rotary station will have four stations or component holders. Usually, each station is required to perform a function at one or more particular positions and this is usually achieved by a pneumatic control line. In U.S. Pat. No. 4,004,333 a four position rotary station has a separate pneumatic control line for each station. The lines are fed through the axial shaft of the station and connect to radial feeds to the respective component holders by respective circumferential passages, similar to a slip-ring arrangement. If two lines are needed to perform an operation, for example for powered forward and then powered return movement, eight such lines would be needed, which will result in a bulky, complex arrangement on the shaft. An alternative is to have a common line for each position, but then all positions must be actuated at the same time.

A third aspect of the invention provides a rotary station comprising a plurality of pneumatically operated stations and means for rotating the stations through a plurality of positions where operations are performed, wherein a gas supply line for operating a station at a particular position is discrete to that position.

By providing a gas supply line which is discrete to the position of operation it is possible to simplify the control of the stations and the supply lines.

It is particularly preferred that the gas supply be provided via table which carries the stations, the table rotating past a supply line at a particular position and having a conduit which supplies air from the supply line to the station.

A fourth aspect of the invention provides a seal between an air supply line and a surface which moves relative to an end of the supply line, the seal comprising a flexible sealing member which encircles the end of the supply line and is arranged to flex outwardly to bear against the surface to form a seal between the end of the supply line and the surface when there is pressurised gas in the supply line.

Other aspects, preferred features and advantages of the invention will be apparent from the following description and the accompanying claims.

DESCRIPTION OF THE PREFERRED EMBODIMENT

Figure 1:
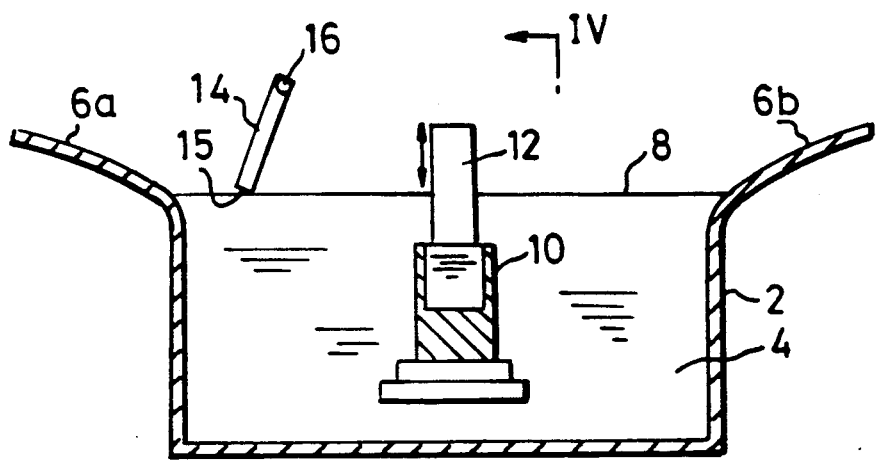
FIG. 1 is a schematic cross-section through a soldering apparatus forming a first embodiment of the invention.
Figure 2:
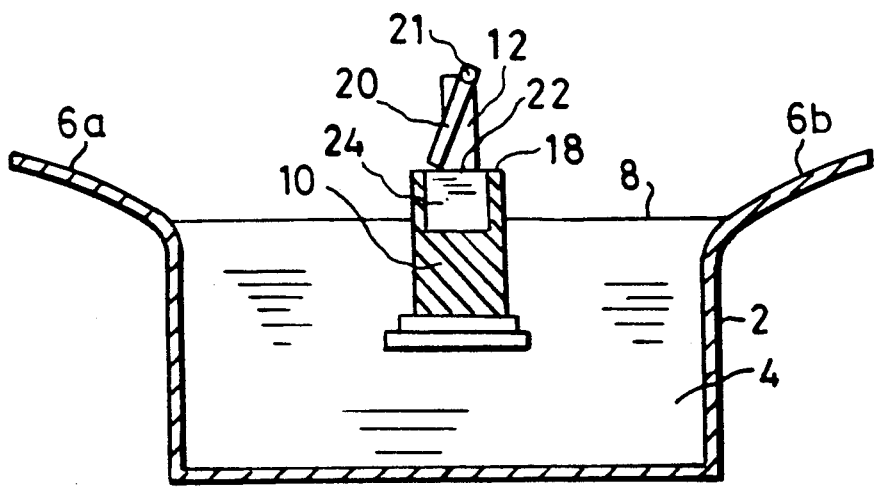
FIG. 2 is a schematic cross-section through the soldering apparatus of FIG. 1 in a second position of operation.

Referring to the drawings, FIGS. 1 and 2 show a bath 2 of molten solder 4. The solder is heated by a heater (not shown) in the bath. The ends 6 of the bath 2 are sloped away from the surface 8 of the solder 4. In FIG. 1, a pot or thimble 10 is below the surface 8 of the solder 4, supported by an arm 12 which is movable up and down.

A first scraper blade 14 of height L' is freely pivoted on a radial arm 16 which sweeps the blade 14 across the surface 8 of the solder 4. The bath 2 is generally arcuate in plan (see FIG. 3) so that the blade 14 sweeps a substantial proportion of the solder surface. As the blade 14 sweeps from left to right in FIG. 1 the lower edge 15 of the blade will slide across the left hand sloping edge 6a of the bath 2 on to the surface of the solder. Dross on the surface of the solder 4 is carried in front of the blade 14 and swept up the right hand sloping edge 6b of the pot 2. In practice, some dross may remain on the surface near the edges of the bath but the region of the solder surface above the pot 10 is well swept by the bottom edge 15 of the blade 14 dragging across the surface.

After the arm 16 and blade 14 sweep beyond the pot 10, the pot 10 is raised by lifting the arm 12. This may be done, for example, by a motorised lead screw mechanism to control the movement accurately. The pot 10 pauses momentarily after the upper edge 18 has cleared the solder surface 8 (as seen in FIG. 2) and a second scraper blade 20 is swept across the surface 22 of solder 24 in the pot 10, the blade being kept clear of the surface 8 of the solder in the bath 4. The blade 20 is freely pivotably mounted on a second radial arm 21 and extends across the full width of the pot, viewed in the direction of the radial arm. After the blade 20 is clear of the pot 10, the pot is raised further to dip solder tags or leads of a component (not shown), (and/or the component may be brought down to meet the solder 24). The bottom edge 21 of the blade 20 will meet the side of the pot 10, just below the rim and side up the slide to scrap across the rim 18. The rim of the pot is flat and in a plane parallel to the bottom edge of the blade 20 so that the blade scrapes across the rim 18.

After soldering or tinning the components leads, the pot 10 is then moved down, back under the surface 8 ready for the next sweep of the arm 14 and the next dipping operation.

The blades 14,20 are of non-metallic, temperature resistant material. By using a material of low thermal conductivity or heat capacity solder will not solidify on the blade as it sweeps across the surface.

The blade 20 serves to separate any dross on the side of the pot 18 from the solder in the pot, and to wipe the meniscus of solder from above the rim of the pot. This helps to achieve a relatively predictable level of solder in the pot 18.

The blades 14,20 are spaced apart, blade 20 following 90 degrees behind blade 14. Preferably, the sweeping movement of the blades is continuous. The movement may be at two speeds, a first relatively slow speed during scraping and a second relatively faster speed to complete the movement of the blades through 360 degrees. The motion of the pot 10 is steady but paused momentarily during scraping with the second blade 20, and possibly also during dipping of the component leads into the solder, depending on the time required for immersion of the leads in the solder.

A plurality of blades 14 and a plurality of blades 20 may be provided, the blades being evenly spaced apart so that a plurality of dipping operations may be performed for one revolution of the blades. In the preferred embodiment only one of each blade is provided, the blade mechanism sweeping 360 degrees to return to a datum position before the next component is brought into position by the next rotary station or a component is inverted for soldering leads on another side.

Figure 3:
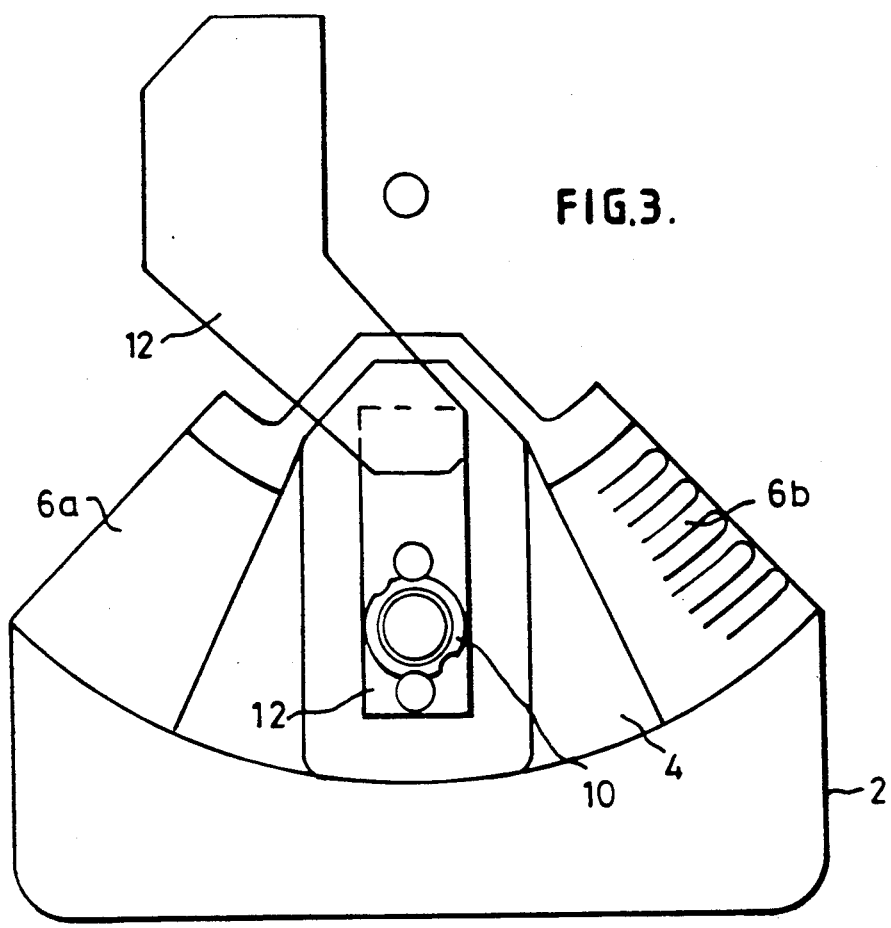
FIG. 3 is a more detailed plan view of the solder bath and apparatus of FIG. 1, with the scraper blades removed.
Figure 4:
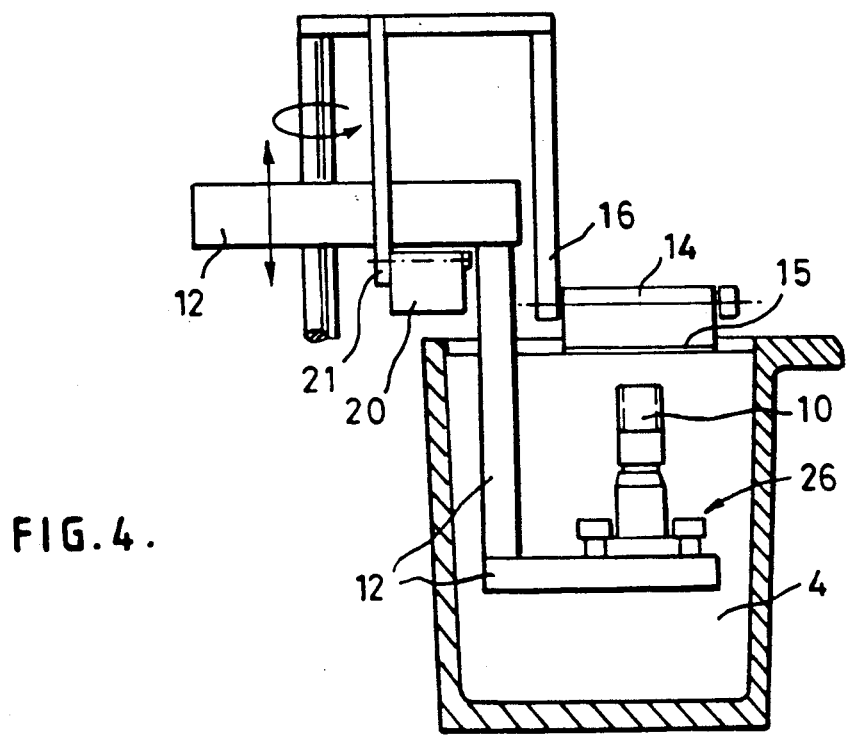
FIG. 4 is a more detailed cross-sectional view along the line IV—IV of FIG. 1.

FIGS. 3 and 4 show in more detail the scraper blade support mechanism and the mechanism for lifting the pot or thimble 10. The pot 10 and arm 12 are quickly detachable so that a pot can be readily replaced, for example to use a different shaped pot.

It will be appreciated that movement of the apparatus is preferably synchronised to provide for efficient operation and this can be achieved by using stepper motors to drive the circularly moving parts and raise the pot under microprocessor control.

Such dip soldering apparatus as described in relation to FIGS. 1 to 4, and its general construction, materials, and mode of operation will be readily apparent to those of ordinary skill in the art. The particularly novel features of the apparatus described reside in the manner of scraping the solder surface and consequent mode of operation.

Referring to FIG. 5, a rotary station 32 has a rotatable table 34 which is carried on a shaft 36 which is driven at its lower end (not shown) and is journalled in a tapered roller bearing 38 carried by a stationary support 40. The table 34 carries four (three are shown) stations 42 which are fixed relative to the table 34 to rotate with the table 34 through four positions 44. The stations 42 are pneumatically operated and are adapted to hold a component 43.

By way of example, the sequence of operation on a product carried by a station 42 would be:

Position 1, place a component on the station

Position 2, flux electrical leads 45 on one side of the component, invert the component and flux the leads on the opposite side, return component to previous orientation, Position 3, tin (solder) the electrical lead 45 on one side of the component and invert component and solder lead on the opposite side, return component to start previous orientation, Position 4, test component;

Position 1, remove component, place new one in the station.

Typically, the fluxing and soldering operations can be achieved using a dip technique, by raising a pot of flux or solder up to the leads 45, or the component may be mounted on a sprung slide which is moved downwards by an overhead ram at the respective position. To facilitate control, it is desirable to bring a component back to a constant orientation before moving to the next position. With a pneumatic unit, this is best achieved by having two air supply lines, forward and reverse, the component holder being rotated through 180 degrees forward, and then back again. This requires two air supply lines at each respective position. A detent mechanism may lock the holder at each orientation.

Figure 5A:
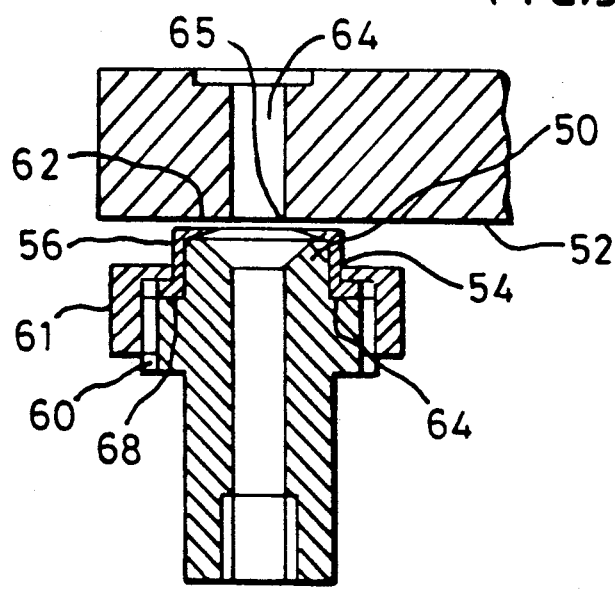
FIG. 5 is a cross-section through a rotary station forming an embodiment of the invention, FIG. 5a showing an enlarged cross-sectional detail of FIG. 5 and illustrating a seal in accordance with the invention.

One such air supply line 48 is shown at each position 44a, 44c in FIG. 5. A line is secured to the support 40 and has an open end 50 spaced a short distance from the underside 52 of the rotatable table 34. A polytetrafluoroethylene (PTFE) sealing member 54 surrounds the end 50 of the line 58. The member 54 comprises a sleeve portion 56 which is a snug fit around the end 50 of the line 48 and has a flange 58 at one end, which flange is held against a threaded rib 60 formed near the end of the line 48 by a nut 61. A radially inward annular lip 62 is formed at the other end of the sleeve 56. The lip 62 tapers in cross-section towards the axis of the sleeve, as is seen clearly in FIG. 5a. The inner edge 65 of the lip 62 is spaced between about 0.04 and 0.1 mm from the underside 52 of the table 34, and defines an aperture which is larger than the cross-section of a conduit 64 in the table 34.

As the table 34 is indexed through ninety degrees to a new position, a conduit 64 of the respective station comes into line with the open end 50 of the line 48 at that new position. The conduit 34 connects with an air input 66 of the station 42.

When air is fed, under pressure, to a station 42, the lip 62 will be pressed outwards due to the air pressure and so bear against the surface 52 to form a seal between the line 48 and conduit 64. When the air pressure is released, at the end of an operation and before the table 34 is indexed through another position, the lip 62 will relax back away from the table 34, and so wear on the lip 62 due to rotation of the table 34 is reduced.

Where a station has separate pneumatically operated controls, such as one for linear movement of a product and another to rotate a product, or as in this embodiment one for forward movement and one for reverse, separate air control and hence separate conduits 64 will be provided in the table 64. Each conduit 64 will mate with an air supply line 48 at a respective position, a conduit being unused if the operation is not performed at that position.

Thus it is possible to supply a number of pneumatic operating lines to each position of a rotary station, each line being individually controlled, without the need for complex and bulky rotational connections in the supply lines.

Figure 6:
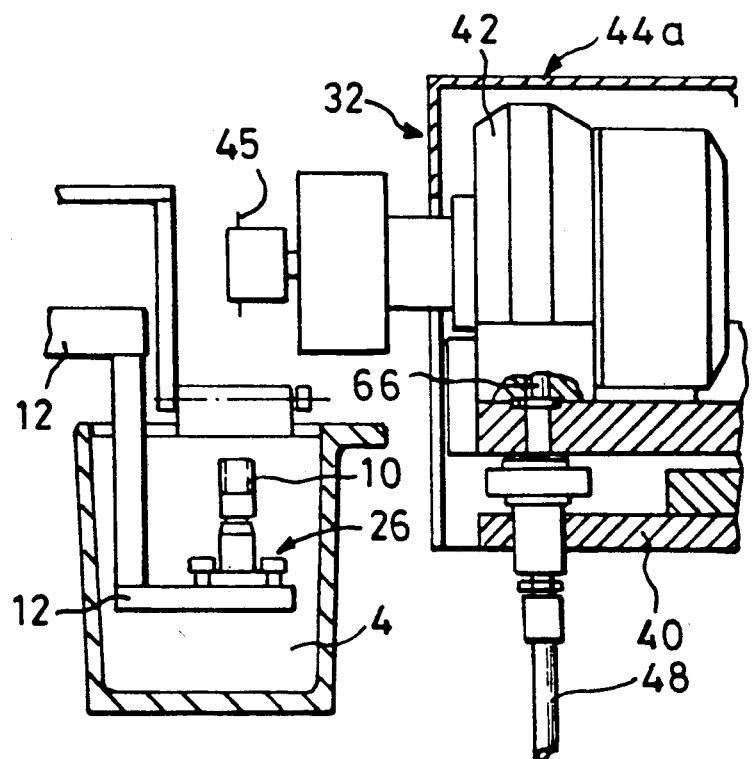
FIG. 6 illustrates in part view the combination of the solder bath apparatus of FIGS. 1 to 4, and the rotary system of FIG. 5.

FIG. 6 illustrates the rotary station of FIG. 5 in juxtaposition with the soldering apparatus of FIGS. 1 to 4, the combination providing a particularly advantageous soldering apparatus in accordance with the invention.

Various modifications may be made to the described embodiments, and it is desired to include all such modifications as fall within the scope of the accompanying claims.

What is claimed is:

1. Soldering apparatus comprising a bath for containing molten solder, a pot movable from beneath a surface of the solder in the bath, and scraper means for scraping the surface of the solder in the bath before the pot is moved upwards through the surface, and for scraping an upper surface of the pot after it has moved upwards through the surface of the solder in the bath, wherein the scraper means comprises two blades, a first blade to scrape the surface of the solder in the bath, and a second blade to scrape the surface of the pot.

2. Soldering apparatus as claimed in claim 1, wherein the blades are swept in a circle to cross the bath and pot in an arc in one direction only.

3. Soldering apparatus as claimed in claim 2, wherein the velocity of movement of the blade is substantially constant.

4. Soldering apparatus as claimed in claim 1, wherein the pot is stopped momentarily after the upper rim of the pot has broached the surface of the solder, while the second blade scrapes the surface of solder in the pot.

5. Soldering apparatus as claimed in claim 4, wherein the pot is moved from a first stationary position below the surface of the solder in the bath, to a second stationary position where the upper surface of the pot is scraped and to a third position where component leads dip into the solder in the pot.

6. Soldering apparatus as claimed in claim 1, wherein the second blade scrapes across a rim of the pot to remove dross from around the rim.

* * * * *